(12) United States Patent
Liu et al.

(10) Patent No.: US 11,255,423 B2
(45) Date of Patent: Feb. 22, 2022

(54) DUAL-CLUTCH AUTOMATIC TRANSMISSION COOLING AND LUBRICATION HYDRAULIC CONTROL SYSTEM AND VEHICLE

(71) Applicant: GREAT WALL MOTOR COMPANY LIMITED, Baoding (CN)

(72) Inventors: Huaxue Liu, Baoding (CN); Lin Zhou, Baoding (CN); Guangqing Tang, Baoding (CN); Jiancheng Gao, Baoding (CN); Wei Zhang, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 374 days.

(21) Appl. No.: 16/499,027

(22) PCT Filed: Mar. 29, 2018

(86) PCT No.: PCT/CN2018/081159
§ 371 (c)(1),
(2) Date: Sep. 27, 2019

(87) PCT Pub. No.: WO2018/177384
PCT Pub. Date: Oct. 4, 2018

(65) Prior Publication Data
US 2020/0032894 A1 Jan. 30, 2020

(30) Foreign Application Priority Data
Mar. 29, 2017 (CN) .......................... 201710198379.5

(51) Int. Cl.
*F16H 57/04* (2010.01)
*F16D 13/72* (2006.01)
*F16D 13/74* (2006.01)

(52) U.S. Cl.
CPC ..... *F16H 57/0413* (2013.01); *F16H 57/0404* (2013.01); *F16H 57/0435* (2013.01);
(Continued)

(58) Field of Classification Search
CPC .............. F16H 57/042; F16H 57/0434; F16H 57/0413; F16H 57/0404; F16H 57/0435;
(Continued)

(56) References Cited

U.S. PATENT DOCUMENTS 9,458,921 B2 * 10/2016 Garabello ........... F16H 57/0446
9,581,177 B2 * 2/2017 Schuller ................ F15B 15/202
(Continued)

FOREIGN PATENT DOCUMENTS

CN 103277505 A 9/2013
CN 104160180 A 11/2014
(Continued)

*Primary Examiner* — Michael A Riegelman
(74) *Attorney, Agent, or Firm* — Volpe Koenig

(57) ABSTRACT

The present invention discloses a dual-clutch automatic transmission cooling and lubrication hydraulic control system and a vehicle. The dual-clutch automatic transmission cooling and lubrication hydraulic control system comprises a clutch lubrication control valve whose outlet end is connected with a clutch lubricating oil circuit, a gear lubrication control valve whose outlet end is connected with a gear and bearing lubricating oil circuit, the inlet end of the gear lubrication control valve being connected with the inlet end of the clutch lubrication control valve in parallel at the first common end, further comprises a mechanical pump and an electronic pump whose inlet ends are connected to an oil tank respectively. The outlet end of the mechanical pump and the outlet end of the electronic pump are connected in the second common end in parallel, and a cooler disposed between the first common end and the second common end. The dual-clutch automatic transmission cooling and lubrication hydraulic control system disclosed herein have a
(Continued)

variety of working modes, reducing the defects such as large displacement of the mechanical pump when working alone.

18 Claims, 4 Drawing Sheets

(52) U.S. Cl.
CPC ..... *F16H 57/0439* (2013.01); *F16H 57/0475* (2013.01); *F16D 13/72* (2013.01); *F16D 13/74* (2013.01)

(58) Field of Classification Search
CPC .. F16H 57/0439; F16H 57/0475; F16D 13/72; F16D 13/74
See application file for complete search history.

(56) References Cited

U.S. PATENT DOCUMENTS

| | | | | |
|---|---|---|---|---|
| 9,863,294 B2* | 1/2018 | Kodama | ................ | F01M 1/02 |
| 10,443,707 B2* | 10/2019 | Spangler | ................ | B60K 6/387 |
| 2002/0069847 A1* | 6/2002 | Iwano | ................ | F15B 1/024 |
| | | | | 123/196 R |
| 2002/0128107 A1* | 9/2002 | Wakayama | ........ | F16H 57/0434 |
| | | | | 475/161 |
| 2003/0116396 A1* | 6/2003 | Kuhstrebe | ............ | F16D 13/644 |
| | | | | 192/48.9 |
| 2006/0006042 A1* | 1/2006 | Koenig | ................ | F16D 21/06 |
| | | | | 192/113.3 |
| 2006/0070600 A1* | 4/2006 | Hara | ................ | F01M 1/02 |
| | | | | 123/196 R |
| 2008/0256943 A1* | 10/2008 | Shimizu | ................ | F16D 25/123 |
| | | | | 60/459 |
| 2008/0308355 A1* | 12/2008 | Kakinami | ................ | F16H 57/04 |
| | | | | 184/27.2 |
| 2009/0215585 A1* | 8/2009 | Grethel | ................ | F16H 61/0031 |
| | | | | 477/79 |
| 2009/0232673 A1* | 9/2009 | Reisch | ................ | F16H 61/0031 |
| | | | | 417/364 |
| 2010/0018808 A1* | 1/2010 | Gloge | ................ | F16H 61/0031 |
| | | | | 184/6.12 |
| 2013/0319366 A1* | 12/2013 | Karasawa | ................ | F01M 1/02 |
| | | | | 123/196 R |
| 2013/0333980 A1* | 12/2013 | Tsunashima | ............ | F01M 1/02 |
| | | | | 184/6.5 |
| 2014/0169994 A1* | 6/2014 | Schuller | ................ | F16H 61/688 |
| | | | | 417/410.1 |
| 2014/0373524 A1* | 12/2014 | Schuller | ................ | F15B 15/202 |
| | | | | 60/429 |
| 2017/0219085 A1* | 8/2017 | Kiyokami | ................ | F01M 1/02 |
| 2018/0274662 A1* | 9/2018 | Spangler | ............ | F16H 57/0473 |
| 2019/0128399 A1* | 5/2019 | Shin | ................ | F16H 57/0436 |
| 2020/0032894 A1* | 1/2020 | Liu | ................ | F16H 57/0439 |
| 2021/0190199 A1* | 6/2021 | Trutschel | ............ | F16H 61/0267 |

FOREIGN PATENT DOCUMENTS

| | | |
|---|---|---|
| CN | 105003645 A | 10/2015 |
| CN | 103518081 B | 3/2016 |
| CN | 105626844 A | 6/2016 |
| CN | 205639582 U | 10/2016 |
| CN | 103968048 B | 4/2018 |
| DE | 102009046369 A1 | 5/2011 |
| JP | 2015-034619 A | 2/2015 |
| WO | 2006/099947 A1 | 9/2006 |
| WO | 2012/125337 A2 | 9/2012 |
| WO | 2012/125337 A3 | 9/2012 |
| WO | 2016/152193 A1 | 9/2016 |

* cited by examiner

DUAL-CLUTCH AUTOMATIC TRANSMISSION COOLING AND LUBRICATION HYDRAULIC CONTROL SYSTEM AND VEHICLE

CROSS REFERENCE TO RELATED APPLICATIONS

This application is a 35 USC § 371 national stage of PCT/CN2018/081159, which was filed Mar. 29, 2018 and claims priority to Chinese Application No. 201710198379.5, which was filed on Mar. 29, 2017, and is entitled "A dual-clutch automatic transmission cooling and lubrication hydraulic control system and vehicle," both of which are incorporated herein by reference as if fully set forth.

FIELD OF THE INVENTION

The present invention relates to the technical field of vehicle hydraulic components, in particular to a dual-clutch automatic transmission cooling and lubrication hydraulic control system. The present invention also relates to the vehicle equipped with the dual-clutch automatic transmission cooling and lubrication hydraulic control system.

BACKGROUND OF THE INVENTION

At present, most of vehicles use dual-clutch automatic transmissions. With a dual-clutch automatic transmission, the transmission body shall have a compact overall structure and a large torque transmission capability. However, when a dual-clutch automatic transmission is used, its internal dual clutch and shifting gears and bearings will generate a large amount of heat due to friction and engagement, therefore, it is necessary to provide a cooling and lubricating liquid hydraulic control system to dissipate heat in time, otherwise it may cause ablation and pitting corrosion of heat producing parts.

Most of the cooling and lubricating liquid hydraulic control systems adopt a mechanical pump for oil supply in the existing structures, which may cause a large displacement of the mechanical pump and low economy performance of fuels. Moreover, the working mode of mechanical pump alone is not suitable for a hybrid transmission structure, resulting in a high R&D cost and losing its competitiveness. In addition, the cooling control structure of the cooling and lubricating liquid hydraulic control system in the existing structures has a poor variability, which cannot be adjusted according to the operating temperature of the transmission, so it has poor practicability.

SUMMARY OF THE INVENTION

In view of this, the present invention aims to provide a dual-clutch automatic transmission cooling and lubrication hydraulic control system for the cooling and lubrication of dual-clutch automatic transmissions, having good practicability.

In order to achieve the above object, the present invention adopts the following technical solutions:

A dual-clutch automatic transmission cooling and lubrication hydraulic control system, comprising:

a clutch lubrication control valve, the outlet end of the clutch lubrication control valve being connected with a clutch lubricating oil circuit;

a gear lubrication control valve, the inlet end of the gear lubrication control valve being connected with the inlet end of the clutch lubrication control valve in parallel at the first common end, the outlet end of the gear lubrication control valve is connected to a gear and bearing lubricating oil circuit;

a mechanical pump, the inlet end being connected to the oil tank, and the outlet end of the mechanical pump being connected with the first control valve;

an electronic pump, the inlet end being connected to the oil tank, the outlet end of the electronic pump being connected with the second control valve, the outlet end of the second control valve being connected with the outlet end of the first control valve at the second common end;

a cooler, connected in series between the first common end and the second common end.

Further, a cold source conduit of the cooler is connected in a loop with an engine cooling system.

Further, the cold source conduit of the cooler is connected in series with an electric water pump.

Further, an outer end of the cooler is connected in series with a filter with a bypass valve.

Further, a bypass valve that operates in response to a pressure difference across the cooler is connected in parallel at both ends of the cooler.

Further, the outlet end of the first control valve is connected with an oil return pipe that is in communication with the inlet end of the mechanical pump.

Further, the first common end is connected with a pressure limiting valve that operates in response to the pressure threshold of the first common end, and the outlet end of the pressure limiting valve is connected to the inlet end of the mechanical pump.

Further, an adsorption filter is connected to the inlet end of both the mechanical pump and the electronic pump.

Further, the clutch lubrication control valve and the gear lubrication control valve are both proportional flow control valves.

The present invention has the following advantages compared to the prior art:

For the dual-clutch automatic transmission cooling and lubrication hydraulic control system of the present invention, the mechanical pump and the electronic pump are disposed in parallel, and the first control valve and the second control valve are provided on the mechanical pump and the electronic pump respectively, thereby different working modes may be adopted according to actual needs, reducing the defects such as large displacement of the mechanical pump when working alone. In addition, by providing a clutch lubrication control valve and a gear lubrication control valve, it is also convenient to control the amount of oil flowing through the clutches, gears and bearings, to ensure the rational used of oil, presenting good practicability.

Another object of the present invention is to provide a vehicle on which a dual clutch automatic transmission is mounted and the described dual-clutch automatic transmission cooling and lubrication hydraulic control system is provided.

The vehicle and dual-clutch automatic transmission cooling and lubrication hydraulic control system of the present invention can achieve the same beneficial effects as that of the prior art, and it is not described herein again.

BRIEF DESCRIPTION OF DRAWINGS

The accompanying drawings, which constitute a part of the present invention, are provided to facilitate further understanding the present invention; the illustrative embodiments and associated description in the present invention are provided to explain the present invention, and shall not be deemed as constituting any improper limitation to the present invention. In the figures.

REFERENCE NUMBERS

1—mechanical pump, 2—the first connecting line, 3—adsorption filter, 4—check valve, 5—the first control valve, 6—pilot solenoid valve, 7—the second connecting line, 8—the second common end, 9—oil return pipe, 10—accumulator, 11—electronic pump, 12—the third connecting line, 13—the second control valve, 14—the fourth connecting line, 15—clutch lubrication control valve, 16—gear lubrication control valve, 17—the fifth connecting line, 18—the sixth connecting line, 19—the first common end, 20—the seventh connecting line, 21—cooler, 22—cold source conduit, 23—engine cooling system, 24—electric water pump, 25—the first filter, 26—the first bypass valve, 27—the eighth connecting line, 28—the second bypass valve, 29—pressure limiting valve.

DETAILED DESCRIPTION OF THE EMBODIMENTS

It is noted that the embodiments and the features in the embodiments in the present invention can be combined freely, provided that there is no confliction between them.

Hereunder the present invention will be detailed in an embodiment with reference to the accompanying drawings.

Embodiment 1

The present embodiment relates to a dual-clutch automatic transmission cooling and lubrication hydraulic control system, comprising a clutch lubrication control valve whose outlet end is connected with a clutch lubricating oil circuit, a gear lubrication control valve whose outlet end is connected with a gear and bearing lubricating oil circuit, the inlet end of the gear lubrication control valve being connected with the inlet end of the clutch lubrication control valve in parallel at the first common end, further comprising a mechanical pump and an electronic pump whose inlet ends are connected to an oil tank respectively. The outlet end of the mechanical pump is connected with the first control valve. The outlet end of the electronic pump is connected with the second control valve, and the outlet end of the second control valve is connected with the outlet end of the first control valve in parallel at the second common end. A cooler is disposed between the first common end and the second common end.

For the dual-clutch automatic transmission cooling and lubrication hydraulic control system, the mechanical pump and the electronic pump are disposed in parallel, and the first control valve and the second control valve are provided on the mechanical pump and the electronic pump respectively, thereby different working modes, such as a mechanical pump working alone, an electronic pump working alone, or simultaneously working of a mechanical pump and an electronic pump, may be adopted according to actual needs, thereby reducing the defects of large displacement of the mechanical pump when working alone, and facilitating control on the amount of oil flowing through the clutches, gears and bearings, presenting good practicability.

Figure 1:
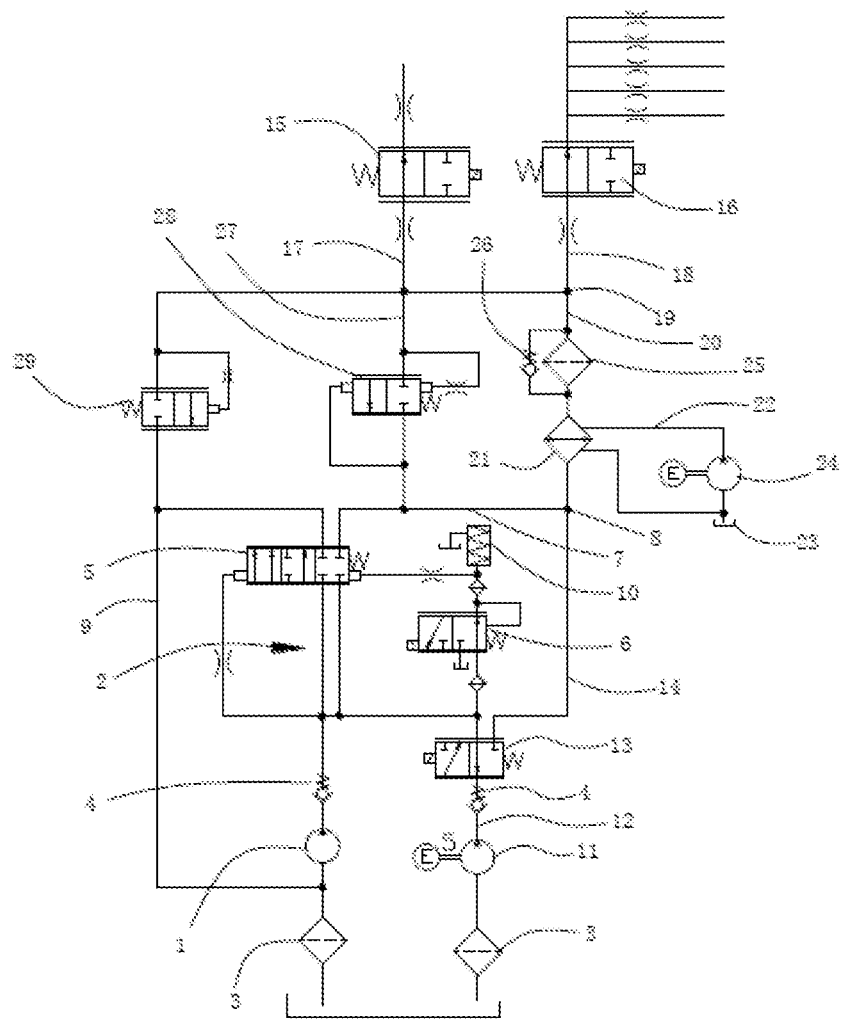
FIG. 1 is a schematic structural diagram of the dual-clutch automatic transmission cooling and lubrication hydraulic control system according to Embodiment 1 of the present invention.

Based on the foregoing design concept, an exemplary structure of a dual-clutch automatic transmission cooling and lubrication hydraulic control system of the present embodiment is shown in FIG. 1, wherein the mechanical pump 1 is connected in series to the first connecting line 2, and an adsorption filter 3 is connected in series at the inlet end of the mechanical pump 1, while a check valve 4 is provided at the outlet end of the mechanical pump, of which, the adsorption filter 3 may implement primary filtration on the oil, while the check valve 4 may prevent back flow of oil. In this embodiment, the first control valve 5 is disposed at the outlet end of the first connecting line 2, and the first control valve 5 is a pressure control valve controlled by a pilot solenoid valve 6, and the first control valve 5 can regulate pressure of the oil amount of the first connecting line 2, a portion of the oil flows to the second connecting line 7, which is connected in parallel with the fourth connecting line 14 described below to form the aforementioned second common end 8, while another portion of the oil is returned to the inlet end of the mechanical pump 1 via the oil return pipe 9.

For the connection between the pilot solenoid valve 6 and the first control valve 5 in the present embodiment, reference may be made to the prior art, and details are not described herein again. In addition, in the present embodiment, an accumulator 10 is provided at the outlet connection of the pilot solenoid valve 6, and the hydraulic shock pressure in the circuit can be absorbed by disposing the accumulator 10, so as to control the first control valve 5 more smoothly and steadily.

In the present embodiment, the electronic pump 11 is in communication with the oil tank via the third connecting line 12, and similarly, an adsorption filter 3 and a check valve 4 are also disposed on the third connecting line 12, and the second control valve 13 is disposed at the outlet end of the third connecting line 12. In this embodiment, the second control valve 13 is a solenoid directional valve, one of the outlet ends of the second control valve 13 is connected in series with the inlet end of the pilot solenoid valve 6, and the other outlet end of the second control valve 13 is connected with a fourth connecting line 14, and the fourth connecting line 14 is connected in parallel with the foregoing second connecting line 7 at the second common end 8. In the above connection structure, when the electronic pump 11 is powered off, the third connecting line 12 is electrically connected to the pilot solenoid valve 6 (since a check valve is provided on the third connecting line 12, the oil can be guaranteed not to flow reversely). When the electronic pump 11 is working, the second control valve 13 performs a reversing action, to turn on the third connecting line 12 and the second common end 8 for outputting oil.

In the present embodiment, the clutch lubrication control valve 15 and the gear lubrication control valve 16 both adopt proportional flow control valves, to enhance the accuracy of lubrication control. As shown in FIG. 1, in this embodiment, the clutch lubrication control valve 15 and the gear lubrication control valve 16 are respectively connected in series to the fifth connecting line 17 and the sixth connecting line 18, and the fifth connecting line 17 and the sixth connecting line 18 are connected in parallel to form the aforementioned the first common end 19 which is in communication with the second common end 8 via the seventh connecting line 20, and the aforementioned cooler 21 is connected in series to the seventh connecting line 20. In this embodiment, in order to ensure the cooling effect of the cooler 21, the cold source conduit 22 of the cooler 21 and the engine cooling system 23 are connected in a loop, and in order to ensure the cooling efficiency, an electric water pump 24 is also connected in series on the cold source conduit 22 of the cooler 21, and by providing the electric water pump 24, it facilitates to achieve accurate control of flow of the cooling liquid in the cold source conduit 22.

In order to reduce the entry of impurities into the clutch lubricating oil circuit and the gear and bearing lubricating oil circuit, as shown in FIG. 1, in the present embodiment, a filter is connected in series on the seventh connecting line 20 at the downstream of the cooler 21, to form the secondary filtering of the oil. For convenience of description, the filter on the seventh connecting line 20 is called the first filter 25, and in order to prevent the conduction of the seventh connecting line 20 due to the blockage of the first filter 25, a bypass valve is also connected in parallel at both ends of the first filter 25, and the bypass valve may be specifically called the first bypass valve 26, and the first bypass valve 26 adopts a check valve, to prevent back flow of oil.

As shown in FIG. 1, in the present embodiment, the eighth connecting line 27 that is disposed in parallel with the seventh connecting line 20 is provided between the first common end 8 and the second common end 19, and a bypass valve disposed corresponding to the cooler 21 is provided on the eighth connecting line 27. In order to distinguish from the first bypass valve 26 described above, the bypass valve on the eighth connecting line 27 is referred to as the second bypass valve 28. In this embodiment, the second bypass valve 28 is a pressure control valve, and specifically, it can operate in response to the pressure difference across the cooler 21 to ensure that the oil can enter the clutch lubrication control valve 15 and the gear lubrication control valve 16 through the second bypass valve 28 when the flow capacity of the cooler 21 is insufficient, and ensure that the lubrication and cooling of the clutch and the gear will not be affected.

In this embodiment, the first common end 19 is further connected with a pressure limiting valve 29 that operates in response to the pressure threshold of the first common end 19, and the outlet end of the pressure limiting valve 29 is connected to the inlet end of the mechanical pump 1. As shown in FIG. 1, the two ends of the limiting valve 29 are respectively connected to the fifth connecting line 17 and the oil return pipe 9, and the pressure control end thereof is connected to the fifth connecting line 17. By providing the pressure limiting valve 29, on the one hand, the excess oil can be returned through the pressure limiting valve 29 when the clutch and the gear are fully engaged or disengaged, and on the other hand, the lubricating oil circuit can be protected from damage due to excessive pressure. The pressure threshold of the pressure limiting valve 29 in this embodiment can be set as needed to adapt to the needs of vehicles of different models.

Figure 2:
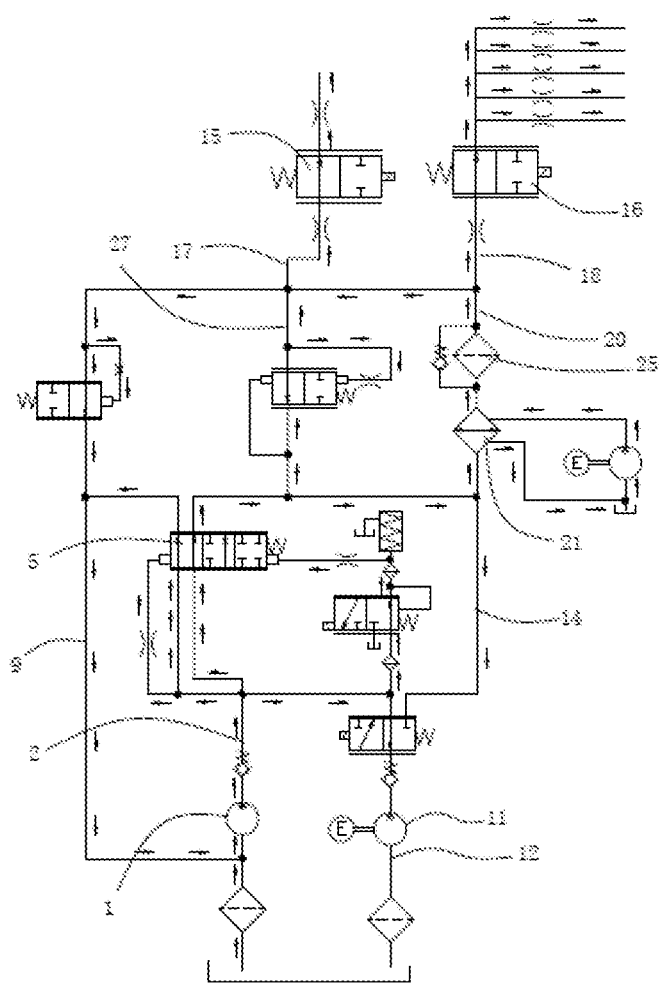
FIG. 2 is a diagram showing an oil circuit when the mechanical pump of the dual-clutch automatic transmission cooling and lubrication hydraulic control system is working alone according to Embodiment 1 of the present invention.

The dual-clutch automatic transmission cooling and lubrication hydraulic control system is used as follows:

As shown in FIG. 2, when the mechanical pump is working alone, the oil is inhaled by the mechanical pump 1 and then distributed by the first control valve 5, and a part of the oil is directly returned to the inlet end of the mechanical pump 1 via the oil return pipe 9, and the other part of the oil is connected to the clutch lubrication control valve 15 and the gear lubrication control valve 16 via the second connecting line 7 and the seventh connecting line 20 successively, the oil is distributed through the clutch lubrication control valve 15 and the gear lubrication control valve 16 to enter the clutch lubricating oil circuit and the gear and bearing lubricating oil circuit respectively, and the excess oil is returned to the inlet end of the mechanical pump 1 via the pressure limiting valve 29.

Figure 3:
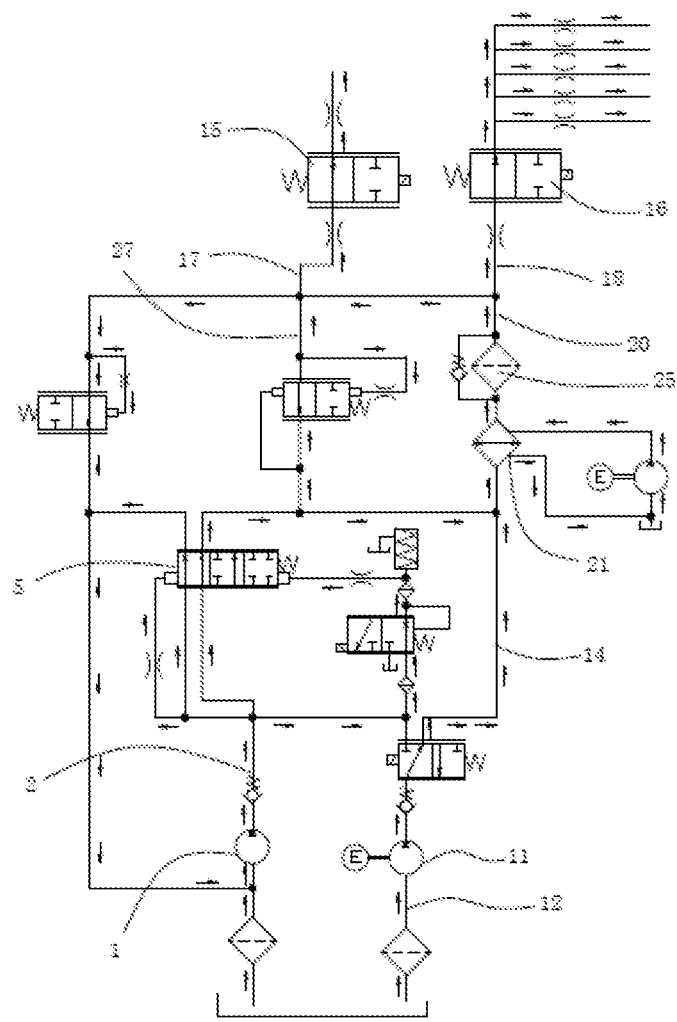
FIG. 3 is a diagram showing an oil circuit when the mechanical pump and the electronic pump of the dual-clutch automatic transmission cooling and lubrication hydraulic control system are working together according to Embodiment 1 of the present invention.

In the above process, when the flow capacity of the cooler 21 is insufficient, the second bypass valve 28 is opened to allow the oil to be connected to the clutch lubrication control valve 15 and the gear lubrication control valve 16 via the eighth connecting line 27. In this embodiment, when the output flow of the mechanical pump 1 cannot meet the cooling requirement under the large friction condition of the clutch, as shown in FIG. 3, the electronic pump 11 is activated, and the second control valve 13 performs the reverse switching operation to turn on the third connecting line 12 and the fourth connecting line, the oil sucked by the electronic pump 11 is connected to the clutch lubrication control valve 15 and the gear lubrication control valve 16 via the third connecting line 12 and the fourth connecting line 14 and the seventh connecting line 20. When the dual clutch is disengaged or fully engaged, the cooling oil is less demanded, and the excess cooling oil is returned to the inlet end of the mechanical pump 1 through the pressure limiting valve 29.

Figure 4:
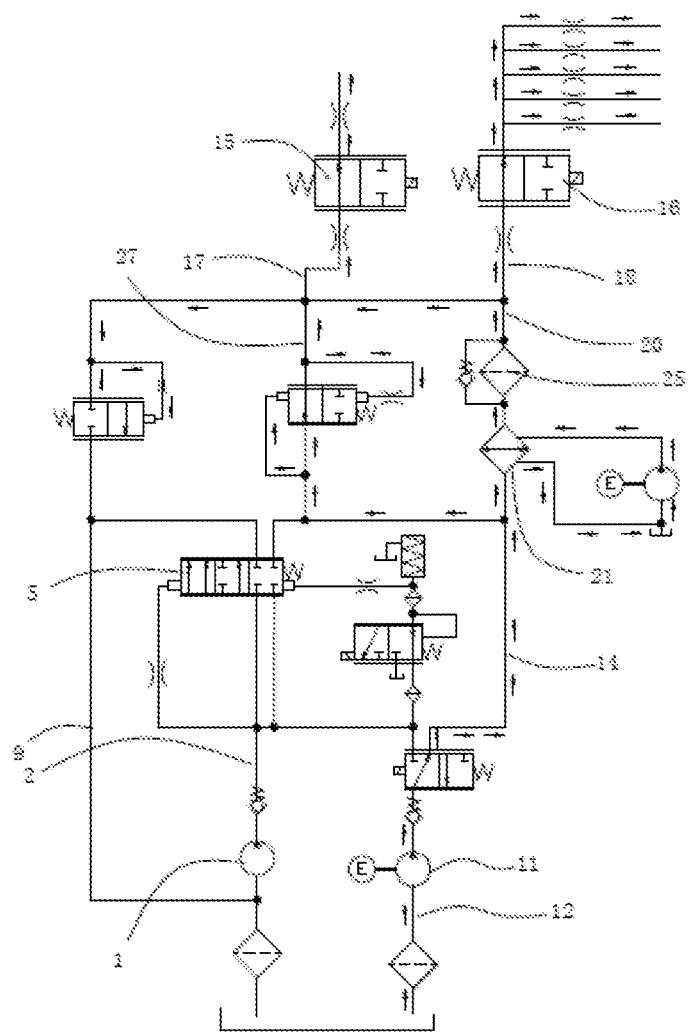
FIG. 4 is a diagram showing an oil circuit when the electronic pump of the dual-clutch automatic transmission cooling and lubrication hydraulic control system is working alone according to Embodiment 1 of the present invention.

In addition, in this embodiment, only the electronic pump 11 can work alone in the hybrid power control system to perform the cooling lubrication functions, and its working process can be as shown in FIG. 4, and the specific oil circuit can refer to the description of FIG. 3 and is not described herein again.

Embodiment 2

The present embodiment relates to a vehicle on which a dual clutch automatic transmission is mounted, and the dual-clutch automatic transmission cooling and lubrication hydraulic control system described in Embodiment 1 is provided. By adopting the dual-clutch automatic transmission cooling and lubrication hydraulic control system described in Embodiment 1, the vehicle has a variety of working modes, thereby reducing the working pressure of the mechanical pump, lowering the displacement of the mechanical pump, and improving fuel economy.

While the present invention is described above in some preferred embodiments, the present invention is not limited to those preferred embodiments. Any modification, equivalent replacement, and improvement made without departing from the spirit and principle of the present invention shall be deemed as falling into the protected domain of the present invention.

The invention claimed is:

1. A dual-clutch automatic transmission cooling and lubrication hydraulic control system, comprising:
   a clutch lubrication control valve, the outlet end of the clutch lubrication control valve being connected with a clutch lubricating oil circuit;
   a gear lubrication control valve, the inlet end of the gear lubrication control valve being connected with the inlet end of the clutch lubrication control valve in parallel at a first common end, the outlet end of the gear lubrication control valve is connected to a gear and bearing lubricating oil circuit;
   a mechanical pump, the inlet end being connected to the oil tank, and the outlet end of the mechanical pump being connected with a first control valve;
   an electronic pump, the inlet end being connected to the oil tank, the outlet end of the electronic pump being connected with the second control valve, the outlet end of the second control valve being connected with the outlet end of the first control valve at a second common end;
   a cooler, connected in series between the first common end and the second common end.

2. The dual-clutch automatic transmission cooling and lubrication hydraulic control system according to claim 1, wherein a cold source conduit of the cooler is connected in a loop with an engine cooling system.

3. The dual-clutch automatic transmission cooling and lubrication hydraulic control system according to claim 2, wherein the cold source conduit of the cooler is connected in series with an electric water pump.

4. The dual-clutch automatic transmission cooling and lubrication hydraulic control system according to claim 2, wherein an outer end of the cooler is connected in series with a filter with a bypass valve.

5. The dual-clutch automatic transmission cooling and lubrication hydraulic control system according to claim 1, wherein a bypass valve that operates in response to a pressure difference across the cooler is connected in parallel at both ends of the cooler.

6. The dual-clutch automatic transmission cooling and lubrication hydraulic control system according to claim 1, wherein an oil return pipe is connected at the outlet end of the first control valve that is in communication with the inlet end of the mechanical pump.

7. The dual-clutch automatic transmission cooling and lubrication hydraulic control system according to claim 1, wherein the first common end is connected with a pressure limiting valve that operates in response to the pressure threshold of the first common end, and the outlet end of the pressure limiting valve is connected to the inlet end of the mechanical pump.

8. The dual-clutch automatic transmission cooling and lubrication hydraulic control system according to claim 1, wherein an adsorption filter is connected to the inlet end of both the mechanical pump and the electronic pump.

9. The dual-clutch automatic transmission cooling and lubrication hydraulic control system according to claim 1, wherein the clutch lubrication control valve and the gear lubrication control valve are both proportional flow control valves.

10. A vehicle, mounted with a dual clutch automatic transmission, wherein the vehicle is further provided with the dual-clutch automatic transmission cooling and lubrication hydraulic control system, wherein,
    the dual-clutch automatic transmission cooling and lubrication hydraulic control system comprising:
    a clutch lubrication control valve, the outlet end of the clutch lubrication control valve being connected with a clutch lubricating oil circuit;
    a gear lubrication control valve, the inlet end of the gear lubrication control valve being connected with the inlet end of the clutch lubrication control valve in parallel at a first common end, the outlet end of the gear lubrication control valve is connected to a gear and bearing lubricating oil circuit;
    a mechanical pump, the inlet end being connected to the oil tank, and the outlet end of the mechanical pump being connected with a first control valve;
    an electronic pump, the inlet end being connected to the oil tank, the outlet end of the electronic pump being connected with the second control valve, the outlet end of the second control valve being connected with the outlet end of the first control valve at a second common end;
    a cooler, connected in series between the first common end and the second common end.

11. The vehicle according to claim 10, wherein a cold source conduit of the cooler is connected in a loop with an engine cooling system.

12. The vehicle according to claim 11, wherein the cold source conduit of the cooler is connected in series with an electric water pump.

13. The vehicle according to claim 11, wherein an outer end of the cooler is connected in series with a filter with a bypass valve.

14. The vehicle according to claim 10, wherein a bypass valve that operates in response to a pressure difference across the cooler is connected in parallel at both ends of the cooler.

15. The vehicle according to claim 10, wherein an oil return pipe is connected at the outlet end of the first control valve that is in communication with the inlet end of the mechanical pump.

16. The vehicle according to claim 10, wherein the first common end is connected with a pressure limiting valve that operates in response to the pressure threshold of the first common end, and the outlet end of the pressure limiting valve is connected to the inlet end of the mechanical pump.

17. The vehicle according to claim 10, wherein an adsorption filter is connected to the inlet end of both the mechanical pump and the electronic pump.

18. The vehicle according to claim 10, wherein the clutch lubrication control valve and the gear lubrication control valve are both proportional flow control valves.

\* \* \* \* \*